(12) United States Patent
Frea et al.

(10) Patent No.: US 12,509,834 B2
(45) Date of Patent: *Dec. 30, 2025

(54) ROUTE CLEANING SYSTEM

(71) Applicant: FAIVELEY TRANSPORT ITALIA S.P.A., Piossasco (IT)

(72) Inventors: Matteo Frea, Turin (IT); Luc Imbert, Turin (IT)

(73) Assignee: Faiveley Transport Italia, S.P.A., Piossasco (Torino) (IT)

( * ) Notice: Subject to any disclaimer, the term of this patent is extended or adjusted under 35 U.S.C. 154(b) by 958 days.

This patent is subject to a terminal disclaimer.

(21) Appl. No.: 17/698,547

(22) Filed: Mar. 18, 2022

(65) Prior Publication Data
US 2022/0205202 A1 Jun. 30, 2022

Related U.S. Application Data

(63) Continuation-in-part of application No. 16/620,909, filed as application No. PCT/IB2018/054224 on Jun. 12, 2018, now Pat. No. 11,305,795.

(30) Foreign Application Priority Data

Jun. 12, 2017 (IT) .................. 102017000064371

(51) Int. Cl.
*E01H 8/10* (2006.01)
*B60L 3/10* (2006.01)
(Continued)

(52) U.S. Cl.
CPC ............... *E01H 8/10* (2013.01); *B60L 3/10* (2013.01); *B60T 8/1705* (2013.01); *B60T 8/172* (2013.01);
(Continued)

(58) Field of Classification Search
CPC ...... B60T 8/1705; B60T 8/172; B60T 17/228; B60T 2210/12; B60L 3/10; B60L 2200/26; E01H 8/10
(Continued)

(56) References Cited

U.S. PATENT DOCUMENTS

| | | | |
|---|---|---|---|
| 4,944,539 A * | 7/1990 | Kumar | B60L 3/10 318/52 |
| 7,027,900 B2 | 4/2006 | Kumar et al. | |

(Continued)

FOREIGN PATENT DOCUMENTS

| | | |
|---|---|---|
| DE | 102006057813 A1 | 6/2008 |
| DE | 102010049303 A1 | 4/2012 |

(Continued)

OTHER PUBLICATIONS

International Search Report and Written opinion for corresponding PCT/IB2018/054224, mailed Sep. 29, 2018.

*Primary Examiner* — Zachary L Kuhfuss
(74) *Attorney, Agent, or Firm* — K&L Gates LLP

(57) ABSTRACT

A method for assessing contamination of a route includes imposing a first sliding value lower than a first threshold between one or more first wheels of a vehicle and the route, the one or more first wheels being the head the vehicle, imposing a second sliding value greater than a second threshold between one or more second wheels of the vehicle and the route, the one or more second wheels following the one or more first wheels and the second threshold being greater than the first threshold, and determining the trend of an adhesion curve between the one or more first wheels and the one or more second wheels and the route, based on a first adhesion value between the one or more first wheels and the route, and a second adhesion value between the one or more second wheels and the route.

18 Claims, 7 Drawing Sheets

(51) Int. Cl.
  *B60T 8/17*   (2006.01)
  *B60T 8/172*  (2006.01)
  *B60T 17/22*  (2006.01)
  *B61K 9/08*   (2006.01)
  *B61L 15/00*  (2006.01)

(52) U.S. Cl.
  CPC .............. *B60T 17/228* (2013.01); *B61K 9/08* (2013.01); *B61L 15/0058* (2024.01); *B60L 2200/26* (2013.01); *B60T 2210/12* (2013.01)

(58) Field of Classification Search
  USPC .................................................. 318/52; 291/2
  See application file for complete search history.

(56) References Cited

U.S. PATENT DOCUMENTS

| | | |
|---|---|---|
| 9,493,143 B2 | 11/2016 | Cooper et al. |
| 10,464,538 B2 | 11/2019 | Rasel et al. |
| 10,780,904 B2 | 9/2020 | Tione |
| 11,305,795 B2 * | 4/2022 | Frea ........................ B61C 15/00 |
| 2005/0065701 A1 * | 3/2005 | Kumar .................... B61C 15/14 |
| | | 701/19 |
| 2007/0001629 A1 * | 1/2007 | McGarry ................. B60L 3/10 |
| | | 318/52 |
| 2014/0058570 A1 | 2/2014 | Kumar et al. |
| 2014/0371959 A1 * | 12/2014 | Kumar .................... B61K 9/08 |
| | | 701/1 |
| 2019/0001822 A1 | 1/2019 | Tione |
| 2019/0111951 A1 | 4/2019 | Tione |
| 2020/0101993 A1 | 4/2020 | Frea et al. |

FOREIGN PATENT DOCUMENTS

| | | |
|---|---|---|
| DE | 102015116862 A1 | 4/2017 |
| EP | 0826548 A1 | 3/1998 |
| EP | 2147840 A1 | 1/2010 |
| EP | 2813409 A1 | 12/2014 |
| WO | 2006113954 A | 11/2006 |
| WO | 2013034714 A2 | 3/2013 |

* cited by examiner

ROUTE CLEANING SYSTEM

CROSS-REFERENCE TO RELATED APPLICATIONS

This application is a continuation-in-part of U.S. application Ser. No. 16/620,909 which was filed 10 Dec. 2019, which is a National Phase filing of PCT International Application No. PCT/IB2018/054224, having an International Filing Date of 12 Jun. 2018, claiming priority to Italian Patent Application No. 102017000064371, having a filing date of Jun. 12, 2017, each of which is incorporated herein by reference in its entirety.

BACKGROUND

Technical Field

The subject matter described herein relates to systems and methods for controlling adhesion between wheels of a vehicle and a route.

Discussion of Art

Electronic systems may be installed on board most modern rail vehicles, which typically include wheel skid control subsystems, intended to intervene both when the vehicle is in the traction phase and when the vehicle is in the braking phase. These subsystems may be known as anti-skid or anti-slide systems, or also WSP (Wheel Slide Protection) systems.

At least one system for controlling the adhesion of the wheels, as an anti-skid function, is schematically represented in FIG. 1, which illustrates a vehicle with n controlled axles $A_1, A_2, \ldots, An$. The axles comprise a respective shaft $S_1, S_2, \ldots, Sn$ and a respective wheelset $W_1, W_2, \ldots, W_n$ integral in rotation with the axles and shafts.

In the drawings, only one wheel of each axle may be shown.

The WSP system of FIG. 1 includes an electronic control unit (ECU), typically based on a microprocessor architecture, that receives tachometer signals relating to the angular velocity of each axle from detectors $SS_1, SS_2, \ldots, SS_n$ associated with the axles. The ECU also is connected to torque control apparatuses $TC_1, TC_2, \ldots TC_n$, each associated with a respective axle.

The ECU carries out a modulation of the torque applied to each axle according to a predetermined algorithm if, in the case of applying torque during traction or braking in a degraded adhesion situation, the wheels of one or more axles end up in a possible incipient skidding condition. Torque modulation is implemented to prevent a total locking of the axles and to bring each axle into a controlled sliding situation for recovering adhesion for an entire duration of the degraded adhesion situation.

In FIG. 2, the curves 1, 2, and 3 represent the trend of adhesion according to ambient conditions. Curve 1 corresponds to an adhesion condition in dry contact conditions between the wheels and routes. Curve 2 corresponds to an adhesion condition in the presence of moisture between the wheels and routes. Curve 3 represents an adhesion condition in presence of viscous material between the wheels and routes, such as oil or rotten leaves (typical condition in the autumn period), or even rust mixed with moisture (typical condition in railway depots).

It has been found that the values of δ at the adhesion peaks $a_1, a_2, a_3$ vary with the change in the adhesion conditions, moving along a curve as indicated at A in FIG. 2.

FIG. 3 is a diagram illustrating forces applied to an axle's wheel A. From this figure it may be understood that:

$$F_m \cdot R = F_A \cdot R - J \cdot (\omega) \tag{2}$$

where:

$$F_A = \mu \cdot m \cdot g \tag{3}$$

whereby:

$$F_m = \mu \cdot m \cdot g - J / R \cdot (\omega) \tag{4}$$

where $F_m$ may be the tangential force applied to a wheel by the traction and/or braking system, R is the radius of the wheel, J is the moment of inertia of the axle, m is the mass resting on the wheel-route contact point, ω is the instantaneous angular acceleration of the axle.

At the same instantaneous angular acceleration, the maximum applicable force $F_m$ may be obtained at the maximum adhesion value μ, i.e. at the points lying on the curve A of FIG. 2.

If the axle is to slide in conditions such as those corresponding to point b in FIG. 2, the value of the available force $F_m$ may be reduced as a result of the reduction of the adhesion value μ. An energy injection phenomenon may be obtained at the wheel-route point of contact. This energy injection may be proportional to the sliding (difference) between the velocity of the vehicle $V_v$ and the tangential velocity $V_r$ of the wheel, with a power (energy injected per unit of time):

$$P(\delta) = F_A(\delta) \cdot (V_v - V_r) = \mu(\delta) \cdot m \cdot g \cdot (V_v - V_r) = \mu(\delta) \cdot m \cdot g \cdot \delta \cdot V_v. \tag{5}$$

The expression (5) may indicate how an increase of the power applied to the wheel-route contact point may be obtained by increasing δ. This injection of energy may cause an overheating of the wheel with a cleaning effect of the point of contact. This cleaning may improve the instantaneous adhesion value μ for the next wheel.

Significant cleaning effects may be obtained in case of moisture or rain, while in presence of lubricants or rotten leaves, the cleaning effect may be less pronounced.

The current systems for recovering adhesion between wheels and routes may impose a fixed sliding value δ, typically between 0.2 and 0.3. The specific value may be calibrated during vehicle approval tests. The selected value of δ may be selected for the type of lubricant used to cause the condition of skidding during the tests, as prescribed, for example, in EN 15595:2009+A1, Railway Applications-Braking-Wheel Slide Protection, para. 6.4.2.1, and may, on the other hand, not be preferred for all types of materials that may cause conditions of skidding during the normal service of the vehicle.

The graph of FIG. 4A shows how the peak of the global adhesion of a vehicle with four axles varies with the change in δ. There may be practically no cleaning factor by bringing all the axles to slide with adhesion corresponding to the value $δ_1$, as in FIG. 4A. Therefore, the four adhesion curves corresponding to the four wheels substantially coincide with each other and each axle takes advantage of the maximum peak adhesion value $μ(δ_1)$.

If, on the other hand, one brings the axles to slide with an adhesion corresponding to the slide $δ_2$ as in FIG. 4B, a high cleaning factor may be obtained. Only the $μ_1$ curve corresponding to the first axle of the vehicle (in the direction of travel) will remain unchanged and equivalent to that of FIG. 4A. The curves corresponding to the following axles may have increasing adhesion values due to the cleaning effect achieved by the previous axle. The value $μ(δ_2)$ for each axle may indeed be lower than the corresponding value $μ(δ_1)$.

As qualitatively shown in FIG. 4C, in the range $δ_1 ≤ δ ≤ δ_2$, a peak average global adhesion value $μ = Σ_1 \, nμ(δ)/n$ (6) may exist.

The above may also apply to a vehicle or train with n axles.

The curves which express the adhesion u as a function of the sliding δ may not be formulated mathematically in an analytical way and may continuously vary with the change in the conditions that cause skidding, the geometry of the contact point, and the external ambient conditions. Therefore, it may not be possible to analytically calculate the preferred sliding value δ a priori.

However, an adhesion control and possible recovery system may analyze the instantaneous adhesion conditions in real time (e.g., during vehicle movement), verify the trend thereof with the change in δ, and may identify the value of δ to maximize or otherwise increase $μ = Σ_1 \, nμ(δ)/n$. Such value, which may be the value that minimizes or reduces the stopping distance in the event of braking in a degraded adhesion condition, may allow the maximum adhesion recovery in case of skidding.

To obviate the disadvantages described above, WO2006/113954A describes a slide control for railway vehicles that is implemented continuously over time. This control requires the identification of the parameters necessary in view of the subsequent desired performance in skid conditions in optimal adhesion conditions. Such method further requires the overall deceleration of the system to be known.

Furthermore, the process of adjusting the preferred sliding values may require significantly long times. This adjustment process may be implemented at the beginning of a skidding phase (e.g., when the vehicle is traveling at high speed, the distance covered by the latter is increased considerably).

In addition, the processes and systems realized according to the prior art are based on the assumption that the wheel adhesion curves are always curves having an adhesion peak $μ_p$ at small sliding values, for example on the order of 1-2%.

Wheel adhesion curves are not always curves having an adhesion peak $μ_p$ at small sliding values. These may be curves having an adhesion peak $μ_p$ at higher sliding values, such as values on the order of 20-25%.

Consequently, if one erroneously acts as if the curve is a curve having an adhesion peak $μ_p$ at small sliding values, that is, a small sliding value is imposed between the wheels and the rails to obtain peak wheel adhesion, the desired benefit is not achieved. In effect, in small slides, this curve, having an adhesion peak of $μ_p$ at higher sliding values, such as, for example, values on the order of 20-25%, exhibits poor levels of adhesion and poor rail cleaning effects (given that the slide imposed is low).

Therefore, the average adhesion value, considering every single adhesion value of the wheels, may not be the preferred one.

BRIEF DESCRIPTION

In one example, a method for assessing contamination of a route on which vehicles travel may include determining a position of an adhesion peak along an adhesion curve of vehicle wheels belonging to controlled axles of a vehicle. Using this determination, improved control and possible recovery of the adhesion of the wheels of a controlled axle of the vehicle may be obtained, and a cleaning effect among various successive axles of the vehicle may be better assessed.

Further features and advantages of the present disclosure will become apparent from the detailed description that follows, provided by way of non-limiting example with reference to the drawings.

DETAILED DESCRIPTION

The subject matter described herein relates to controlling adhesion between a vehicle and a route traveled upon by the vehicle. The adhesion is controlled by evaluating values of adhesion between wheels (or tires) of the vehicle and the route. These adhesion values can be evaluated by identifying a peak value of the adhesion values. The peak value can be a maximum adhesion value, an adhesion value that exceeds a threshold but that is not necessarily the maximum adhesion value, or the like. The peak value that is identified can be used to control the traction between the vehicle and the route. This can increase adhesion between the wheels (or tires) of the vehicle and the route and thereby obtain improved control and possible recovery of the adhesion of the wheels of a controlled axle of a railway vehicle.

While one or more embodiments are described in connection with a rail vehicle system traveling on a track formed from rails, not all embodiments are limited to rail vehicle systems, tracks, or rails. Unless expressly disclaimed or stated otherwise, the subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

Figure 1:
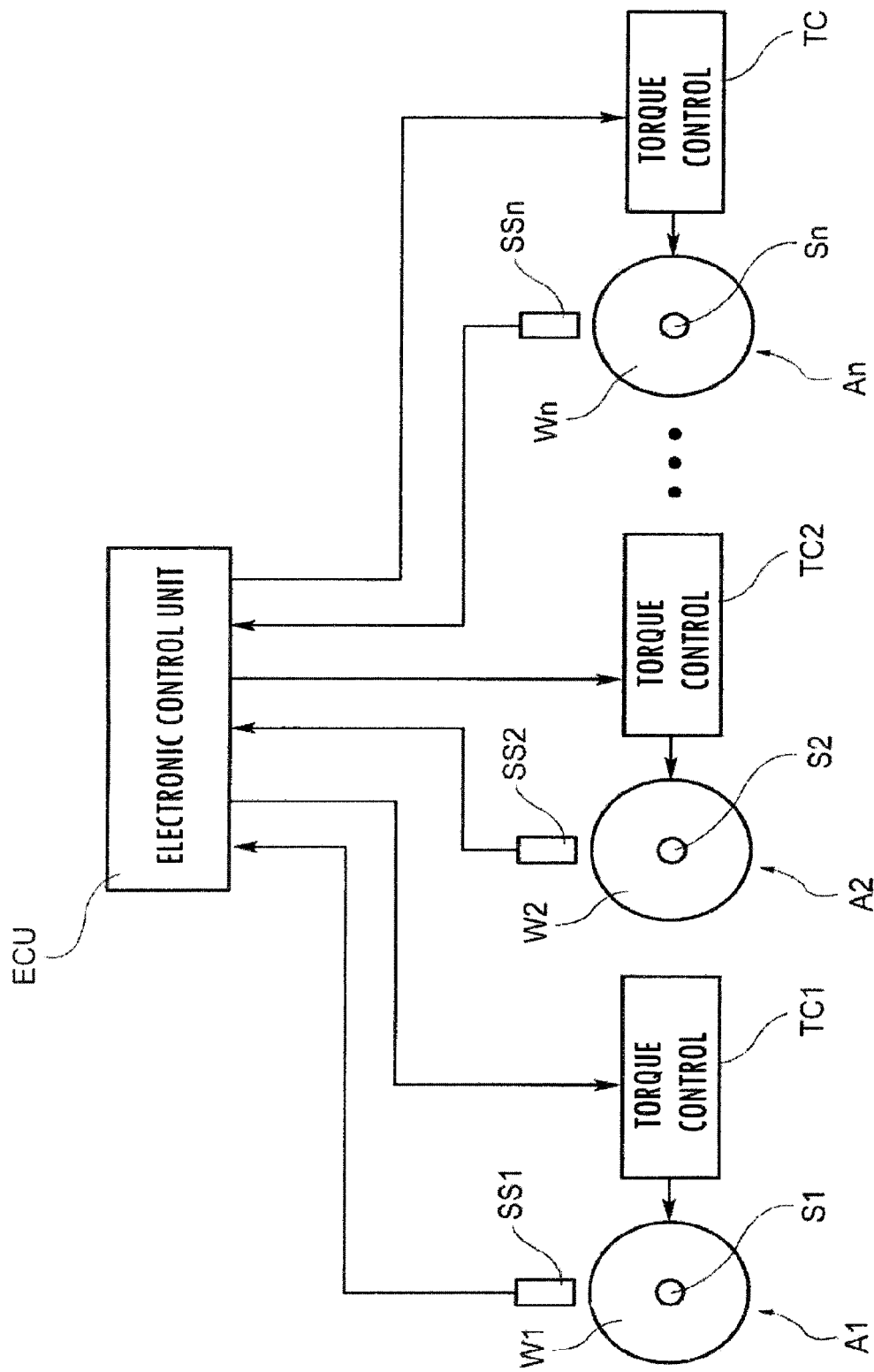
FIG. 1 is a block diagram of an anti-skid control system of the wheels of a vehicle.
Figure 2:
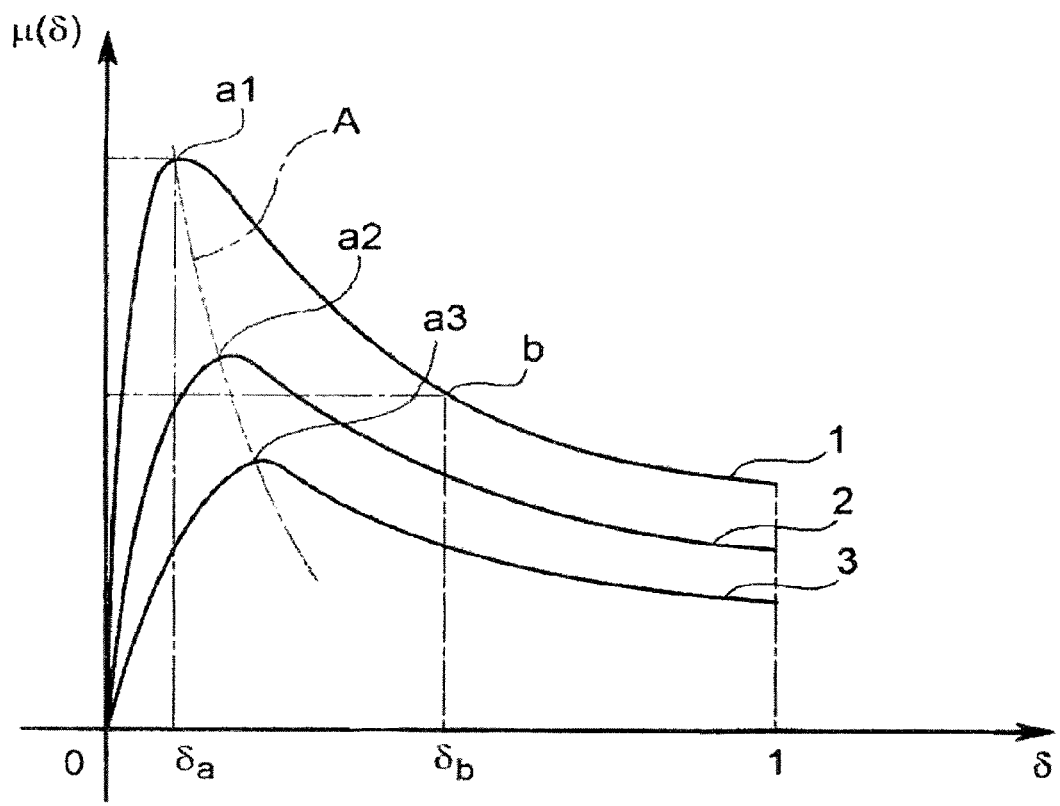
FIG. 2 is a graph showing qualitatively the trend of the adhesion coefficient μ of the wheels of an axle, shown on the y-axis, as a function of the sliding δ, shown on the x-axis.
Figure 3:
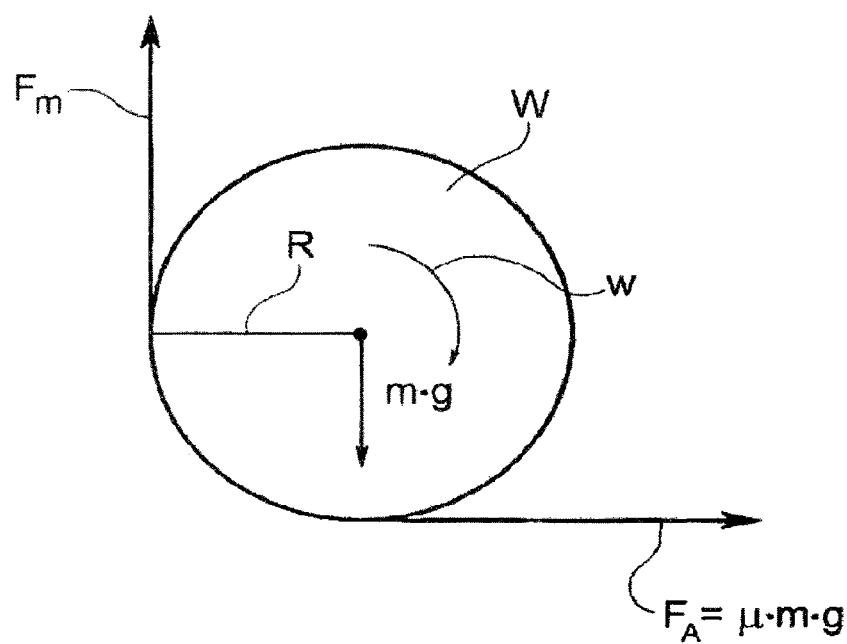
FIG. 3 is a diagram illustrating the forces applied to an axle's wheel.
Figure 4A:
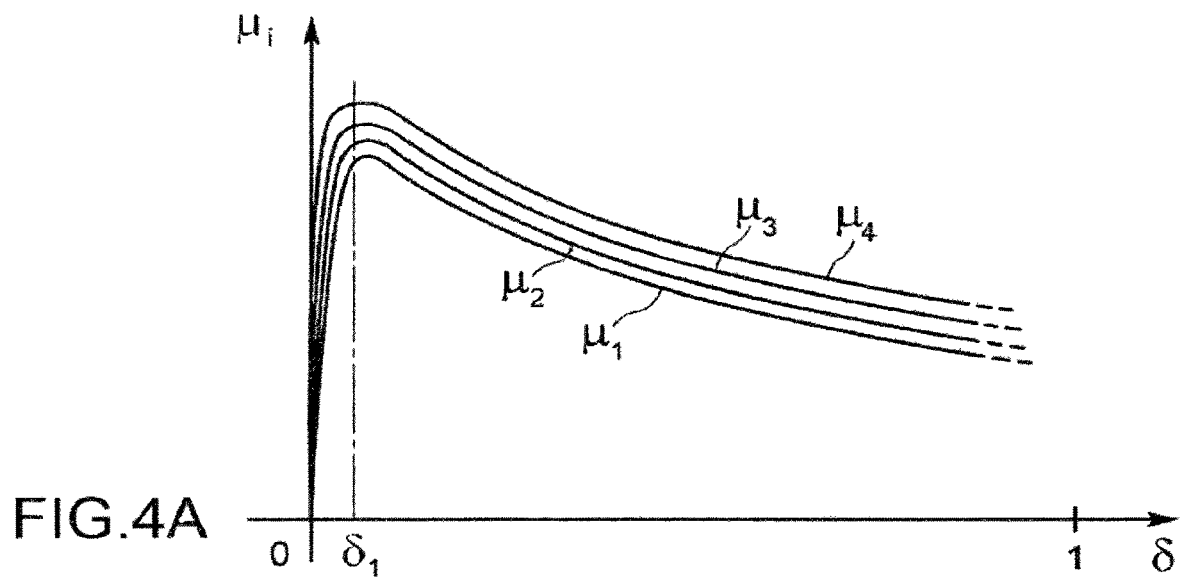
FIGS. 4A, 4B are graphs showing qualitatively the trends of the adhesion coefficient μ of the wheels of four axles of a vehicle in two different operating conditions.
Figure 4B:
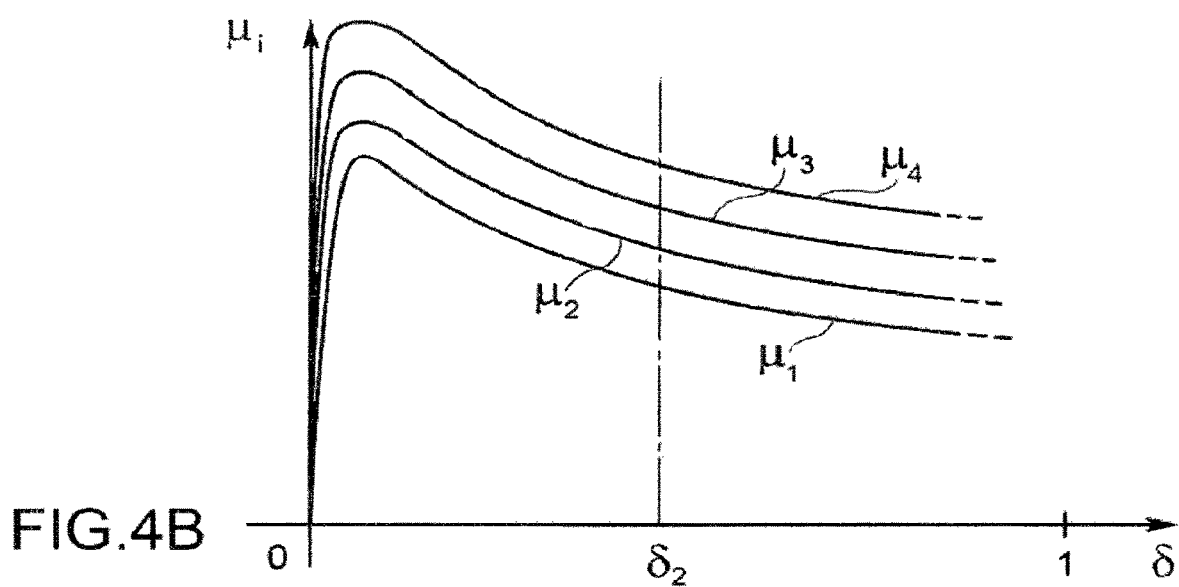
Figure 4C:
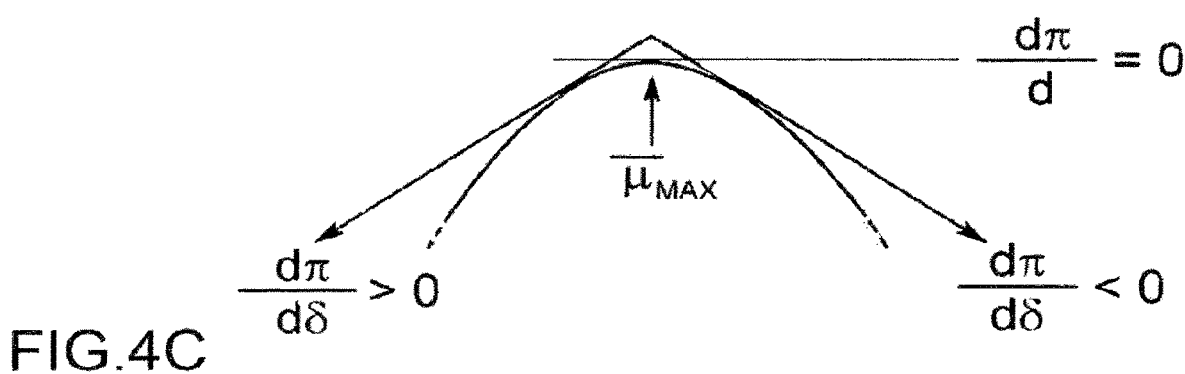
FIG. 4C illustrates the trend of an average adhesion curve μ around the peak value.
Figure 5:
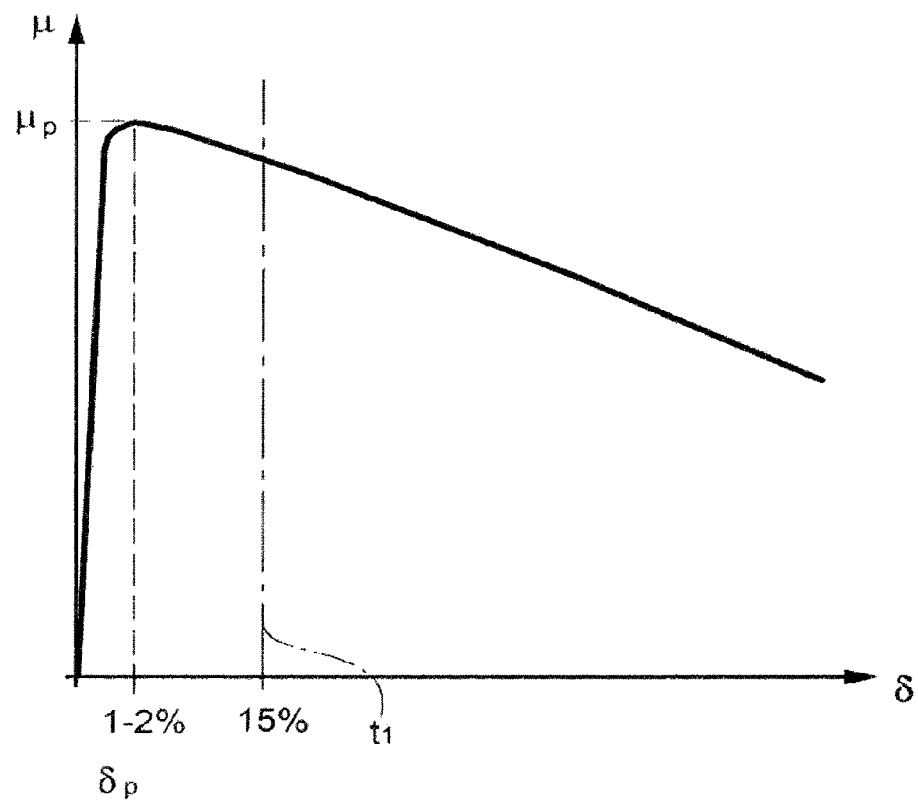
FIG. 5 is a graph illustrating an adhesion curve having an adhesion peak at a sliding value lower than the first predetermined threshold.

Initially referring to adhesion curves shown in FIG. 5, the adhesion peak $\mu_p$ is obtained for small sliding values of the order of 1-2%. The adhesion peak can be the maximum value or a value that exceeds a threshold but not necessarily the largest value. The sliding values can be an amount of wheel slip, such as a percentage that the rotational speed of a wheel is faster than the moving speed of the vehicle over the route.

Defining $\delta_p$ as the sliding value for which the adhesion peak $\mu_p$ may be obtained, it may be determined that if the axle is brought to slide close to $\delta_p$ (small slide), there will be a negligible cleaning effect to the benefit of the local adhesion which assumes the peak value $\mu_p$. For example, if the wheels or tires connected to the axle experience or have a sliding value that corresponds to the peak adhesion value, then these wheels or tires have little to no sliding or slip along the route. This may result in little, no, or less cleaning of the route by those wheels or tires (relative to wheels or tires that slide or slip more along the route, and that are associated with sliding values that do not correspond with the peak adhesion value).

Conversely, if the axle is brought to slide at higher sliding values $\delta$, there may be a loss of local adhesion to the benefit of a possible cleaning effect for the following axles. For example, if the wheels or tires connected to the axle experience or have a sliding value that exceeds the peak adhesion value, then these wheels or tires have greater slide or slip along the route. This may result in better cleaning of the route by those wheels or tires (relative to wheels or tires that slide or slip less along the route, and that are associated with sliding values that correspond with the peak adhesion value). Such effect may be more or less effective depending on the type and amount of contaminant present. The effectiveness of the cleaning may be an unknown datum a priori.

To increase an average adhesion of the axles, multiple factors may be considered when choosing sliding points to make the axles work. These factors may include one or more of the benefit of cleaning on the following or trailing axles (increasing as the local sliding increases), and/or local adhesion value (decreasing as the sliding increases).

Figure 6:
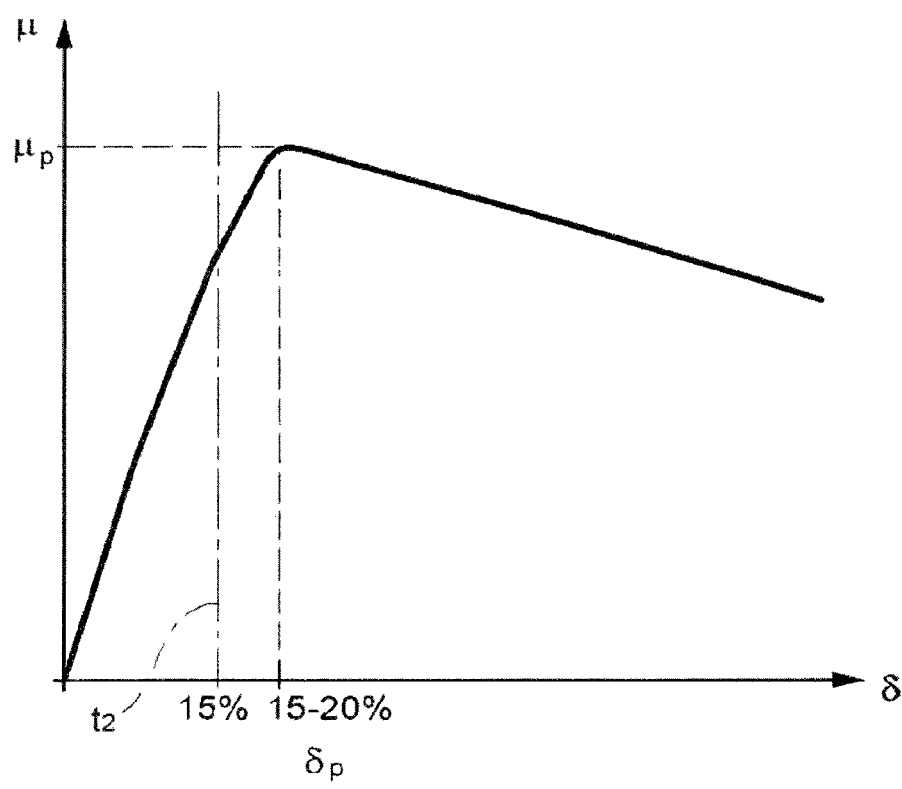
FIG. 6 is a graph illustrating an adhesion curve having an adhesion peak at a sliding value greater than the second predetermined threshold.

Conversely, in case of an adhesion curve as shown FIG. 6, literature and results of experimental tests carried out on rolling stock, may demonstrate that the trend of the adhesion curves may depend on many factors, among which, type and amount of contaminant, and weight of the vehicle. Not all adhesion curves necessarily exhibit an adhesion peak $\mu_p$ for small sliding values, such as that of FIG. 5. There are cases wherein the adhesion peak $\mu_p$ is obtained for higher sliding values ($\delta_p \approx 20\%$), like the curve in FIG. 6.

In such case, if the axle is brought to slide at small sliding values (e.g. $\delta=1$-2%), the cleaning effect may be practically zero and the local adhesion may be reduced with respect to the peak value. Conversely, if the axle is brought to slide at higher values $\delta$ (e.g. $\delta \approx 20\%$), there may be a benefit both on the local adhesion and on a possible cleaning effect for the following axles.

In the case of adhesion curves such as those of FIG. 6, therefore, regardless of the effectiveness of the cleaning, the most appropriate choice may be to bring all the axles into large slides ($\delta \approx 20\% \approx \delta_p$) increasing both the local adhesion and the possible cleaning effect.

Based on the above concepts, the method for assessing contamination of a route, particularly for a railway vehicle, may include imposing a first sliding value $\delta_1$ that is lower than a first predetermined threshold $t_1$ between one or more first wheels $W_1$ of a first controlled axle $A_1$ of a vehicle and the route. Imposing the sliding value may be accomplished by controlling the torque generated by the motors to cause the wheels to slide along the route at the sliding value. The first controlled axle $A_1$ may be the head or a leading axle of the vehicle according to the direction of travel of the vehicle (e.g., head or leading of one or more, or all, other axles along the direction of travel. The method also may include imposing a second sliding value $\delta_2$ greater than a second predetermined threshold $t_2$ between one or more second wheels of a second controlled axle $A_2$ and the route. The second axle $A_2$ may be an axle following the first axle $A_1$ according to the direction of travel of the vehicle. For example, the head or leading axle may be positioned ahead of the second axle along the direction of travel of the vehicle. The second predetermined threshold $t_2$ may be larger than the first predetermined threshold $t_1$. The method also may include determining the trend of the adhesion curve between the wheels W belonging to a plurality of controlled axles $A_n$ of the vehicle and the route based on a first adhesion value $\mu_1$ between the wheels of the first axle $A_1$ and the rail, and a second adhesion value $\mu_2$ between the wheels of the second axle $A_2$ and the rail.

The trend of the adhesion curve between the wheels W belonging to a plurality of controlled axles $A_n$ of the vehicle and the route may be determined by measuring the first adhesion value $\mu_1$ between the first wheels of the first axle $A_1$ and the route, and by measuring the second adhesion value $\mu_2$ between the second wheels of the second axle $A_2$ and the route. If the second adhesion value $\mu_2$ is greater than the first adhesion value $\mu_1$, the adhesion curve between the wheels W belonging to the plurality of controlled axles $A_n$ of a vehicle and the route may be an adhesion curve having an adhesion peak $\mu_p$ at a sliding value $\delta_p$ greater than the second predetermined threshold $t_2$. If the second adhesion value $\mu_2$ is lower than the first adhesion value $\mu_1$, the adhesion curve between the wheels W belonging to a plurality of controlled axles $A_n$ of a vehicle and the route may be an adhesion curve having an adhesion peak $\mu_p$ at a sliding value $\delta_p$ lower than the first predetermined threshold $t_1$.

By way of example, the first predetermined threshold $t_1$ may coincide with a sliding value of about 5%, and the first sliding value $\delta_1$ less than the first predetermined threshold between the first wheels of a first controlled axle $A_1$ and a route may be about 1-2%. The second predetermined threshold $t_2$ may coincide with a sliding value between about 15% and 25%, and the second sliding value $\delta_2$, greater than the second predetermined threshold between the second wheels of at least one second controlled axle $A_2$ and the route may be comprised between 20%-25%.

Preferably, the second sliding value $\delta_2$ may not exceed a limit sliding value $\delta_{limit}$ equal to about 25%.

If the adhesion curve between the wheels W belonging to a plurality of controlled axles $A_n$ of a vehicle and the route has an adhesion peak $\mu_p$ at a sliding value greater than the second predetermined threshold $t_2$, the contamination of the route may be assessed by imposing a sliding value $\delta$ between the wheels of all controlled axles and the route, with the sliding value being greater than the second predetermined threshold $t_2$.

On the other hand, if the adhesion curve between the wheels W belonging to the plurality of controlled axles $A_n$ of a vehicle and the route has an adhesion peak $\mu_p$ at a sliding value $\mu_p$ less than the first predetermined threshold $t_1$, the contamination of the route may be assessed by calculating the value of the adhesion difference $\Delta\mu_{slide}$ as the difference between the first adhesion value $\mu_1$ and the second adhesion value $\mu_2$. The second sliding value $\delta_2$ may be imposed between one or more third wheels of at least one third axle $A_3$ and the route. This second sliding value may be greater than a second predetermined threshold $t_2$. The third axle $A_3$ may be the axle that follows the second axle $A_2$ according to the direction of travel of the vehicle. The value of the adhesion difference $\Delta\mu_{clean}$ generated by the cleaning effect of the second wheels of the second axle $A_2$ to the benefit of the third wheels of the third axle $A_3$ may be calculated. The value of the adhesion difference $\Delta\mu_{clean}$ may be based on the difference between the adhesion value $\mu_3$ between the third wheels of the third axle $A_3$ and the route, and based on the adhesion value $\mu_2$ between the second wheels of the second axle $A_2$ and the route. A sliding value $\delta$ may be imposed between the wheels W of all the controlled axles $A_1, \ldots, A_n$ and the route. This sliding value may be greater than the second predetermined threshold $t_2$. This sliding value may be imposed if the value of the adhesion difference $\Delta\mu_{clean}$ (generated by the cleaning effect of the wheels) is predominant (e.g., larger or significantly larger) with respect to the value of the adhesion difference $\Delta\mu_{slide}$ multiplied by an adaptive factor $F_{ad}$. The value of this factor may be inversely proportional to the number of axles A sliding value $\delta$ may be imposed between the wheels W of all the controlled axles $A_1, \ldots, A_n$ and the route if the value of the adhesion difference $\Delta\mu_{clean}$ generated by the cleaning effect of the wheels is not predominant over the value of the adhesion difference $\Delta\mu_{slide}$ multiplied by an adaptive factor $F_{ad}$. This sliding value may be smaller than the first predetermined threshold $t_1$. The value the adaptive factor may be inversely proportional to the number of axles.

If the adhesion curve of the wheels W belonging to a plurality of controlled axles $A_n$ of a vehicle has an adhesion peak $\mu_p$ at a sliding value $\delta_p$ less than the first predetermined threshold $t_1$, the contamination of the route may be assessed by imposing a second sliding value $\delta_2$ greater than the second predetermined threshold $t_2$ between the wheels of all the controlled axles $A_1, \ldots, A_O$ and the route. Due to the non-predominance of the value of the adhesion difference $\Delta\mu_{clean}$ generated by the cleaning effect of the wheels with respect to the value of the adhesion difference $\Delta\mu_{slide}$ multiplied by an adaptive factor $F_{ad}$, the value being inversely proportional to the number of axles, if the adhesion value $\mu_n$ in of the wheels of a previous axle $A_n$ is coincident with the adhesion value $\mu_{n+1}$ of the wheels of the next axle $A_{n-1}$, then a first sliding value $\mu_1$ is imposed that is lower than the first predetermined threshold $t_1$ between the wheels of at least one following axle $A_{n+1}, A_{n+2}, \ldots$ and the route.

Due to this last step described above, the cleaning effect of the route that was exhibited in the first axles according to the direction of travel may no longer involve an increase in adhesion for the following axles (for example, because now the route may be completely clean). Consequently, it may be appropriate to impose on the following axles the sliding value corresponding to the adhesion peak and not a sliding value useful for cleaning the route.

By way of example, the second axle may be the previous axle $A_n$ and the third axle may be the following axle $A_{n+1}$. A second sliding value $\mu_2$ greater than the second predetermined threshold $t_2$ is imposed. Due to the non-predominance of the value of the adhesion difference $\Delta\mu_{clean}$ generated by the cleaning effect of the wheels with respect to the value of the adhesion difference $\Delta\mu_{slide}$ multiplied by an adaptive factor $F_{ad}$, a first sliding value $\mu_1$ may be imposed less than the first predetermined threshold $t_1$ between the wheels of the axles following the third axle and the route, if the adhesion value $\mu_2$ of the wheels of the second axle $A_2$ (previous axle $A_n$) coincides with the adhesion value $\mu_3$ of the wheels of the at least one third axle (following axle $A_{n+1}$).

By way of example, the method for assessing contamination of a route may be repeated after a predetermined time interval (for example every 30 seconds) or it may be repeated after a predetermined distance has been traveled by the vehicle.

A method for cleaning or assessing the cleaning of a route of a vehicle also is provided. This method may include assessing the contamination based on the determined adhesion value of the wheels and imposing a sliding value that may contribute to cleaning of a route. The method may include controlling the movement of the first wheels and/or the second wheels based on the trend of the adhesion curve that is determined. The cleaning of a route for a vehicle may be assessed by imposing a first sliding value $\mu_1$ between the first wheels of a first controlled axle and the route, with the sliding value being lower than a first predetermined threshold $t_1$. The cleaning of the route may be based on the trend of the adhesion curve that is determined. The movement of the first wheels and/or the second wheels may be controlled based on the trend of the adhesion curve in order to assist in cleaning of the route. The first wheels and/or the second wheels may be controlled to intentionally or purposefully slip against the route in order to help facilitate cleaning of the route. As discussed previously, the more slip between the wheels and the route may generally be associated with greater cleaning of the route by the wheels. (According to one aspect, controlling a wheel for purposeful wheel slip may include accelerating or decelerating (braking) a wheel to an extent to overcome friction between the wheel and route surface, for a relative movement between the wheel and route surface, and including the possibility of braking the wheel so it drags against the route.) The first controlled axle $A_1$ may be the head axle of the railway vehicle according to the direction of travel of the railway vehicle. A second sliding value $\mu_2$ may be imposed between the second wheels of a second controlled axle $A_2$ and the rail, with the sliding value being greater than a second predetermined threshold $t_2$, where the second axle $A_2$ being the axle following the first axle $A_1$ according to the direction of travel of the train. The second predetermined threshold $t_2$ may be greater than the first predetermined threshold $t_1$. A third sliding value $\delta_3$ may be imposed between the third wheels of a controlled third axle $A_3$ and the rail, the third sliding value may be equal to the second sliding value $\delta_2$. The third axle $A_3$ may be the axle following the second axle $A_2$ according to the direction of travel of the train. The effectiveness of the cleaning of the rail generated by the sliding of the second axle $A_2$ to the benefit of the third axle $A_3$ may be determined based on a first adhesion value $\mu_2$ between the second wheels of the second axle $A_2$ and the rail and a second adhesion value $\mu_3$ between the third wheels of the third axle $A_3$ and the rail.

The aforesaid step of determining the effectiveness of the cleaning of the rail may include measuring the first adhesion value $\mu_2$ and the second adhesion value $\mu_3$ and determining the effectiveness of the cleaning by performing a subtraction operation between the second adhesion value $\mu_3$ and the first adhesion value $\mu_2$.

By way of example, an illustrative case is described below wherein the total number of axles of the vehicle is four.

Figure 7:
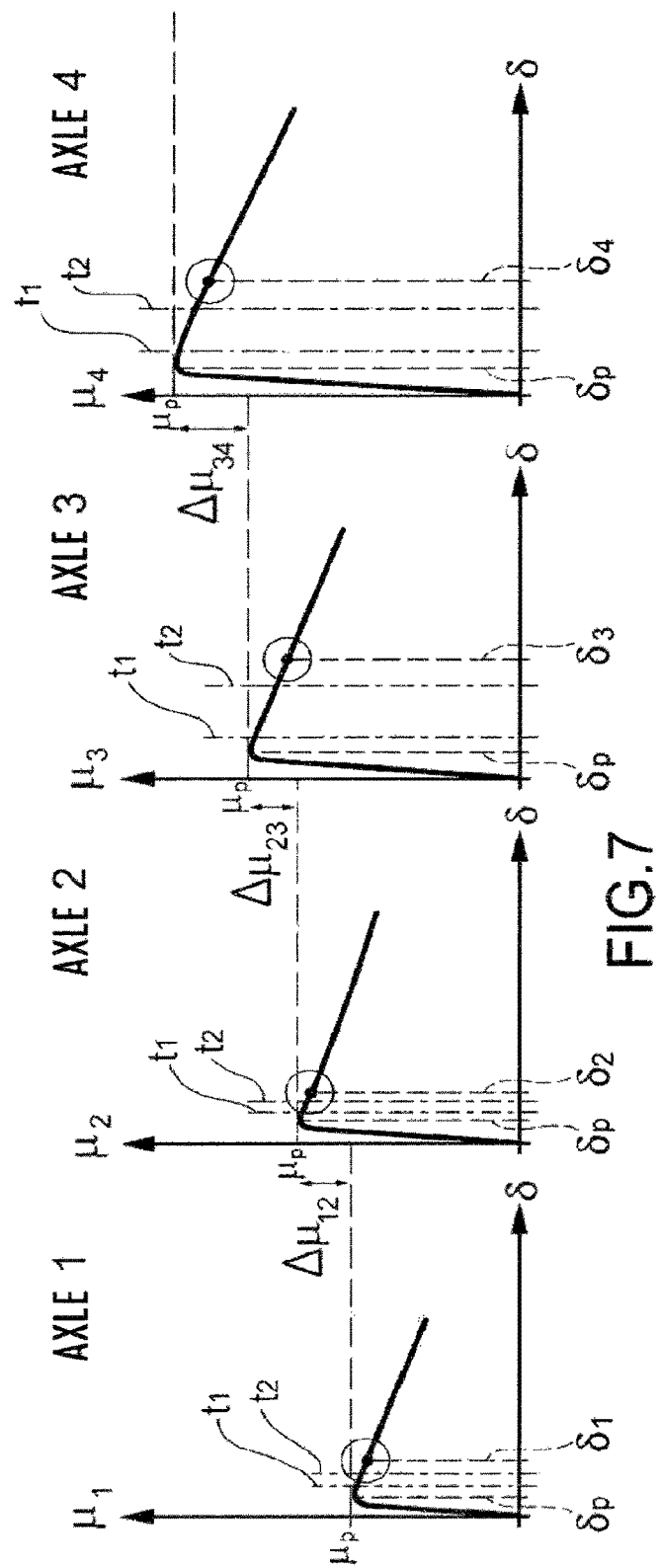
FIG. 7 shows four adhesion curves, respectively of wheels belonging to four consecutive axles, in case of a cleaning effect of the route.

Considering FIG. 7, it is possible to assess the adhesion engaged by the four axles making up the vehicle.

The adhesion $\mu_1$ available for the first axle $\delta_1$ may not be influenced by the cleaning, such axle being the first to encounter the route. The adhesion $\mu_1$ may depend only on the conditions of the route, i.e. the ambient/contaminant conditions that will be indicated in the following with "amb."

The adhesion $\mu_1$ engaged by the first axle may be a function of the local sliding $\mu_1$ of the first axle on the route:

$$\mu_1 = f(\mu_{max}, \delta_1) = f(amb, \delta_1)$$

Conversely, the adhesion $\mu_2$ available for the second axle may depend on the cleaning produced by the previous first axle ($\Delta\mu_{12}$).

$$\mu_{2,max} = \mu_{max} + \Delta\mu_{12}$$

The cleaning produced by the first axle in favor of the second axle $\Delta\mu_{12}$ may be a function of the sliding $\delta_1$ of the first axle on the route, as well as of the cleaning characteristics typical of the contaminant (contaminant more or less easy to remove with the same sliding), which are indicated hereinafter with the term "cleaning".

$$\mu_{2,max} = \mu_{max} + f(\text{clean}, \delta_1)$$

The adhesion $\mu_2$ engaged by the second axle may be a function of the local sliding $\delta_2$ of the second axle on the route.

$$\mu_2 = f(\mu_{2,max}, \delta_2) = f(amb, \delta_1, \text{cleaning}, \delta_2)$$

Likewise, the adhesion $\mu_3$ engaged by the third axle may depend on the local sliding $\delta_3$ and on the cleaning produced by the previous axles, hence by $\delta_1$, $\delta_2$ and by cleaning.

Likewise, the adhesion $\mu_4$ engaged by the fourth axle may depend on the local sliding $\delta_4$ and on the cleaning produced by the previous axles, hence by $\delta_1$, $\delta_2$, $\delta_3$ and by the cleaning.

According to these considerations:

$$\mu_{average} = 1/4 * (f(amb, \delta_1) + f(amb, \delta_1, \delta_2, \text{cleaning}) + f(amb, \delta_1, \delta_2, \delta_3, \text{cleaning}) + f(amb, \delta_1, \delta_2, \delta_3, \delta_4, \text{cleaning}))$$

Figure 8:
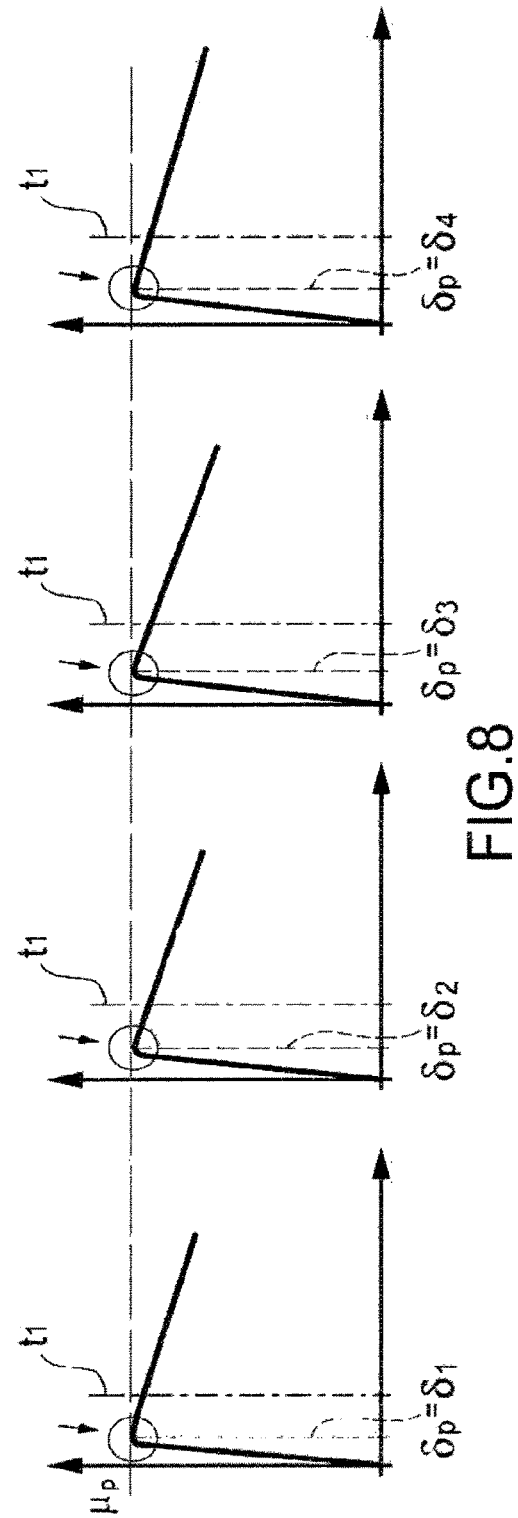
FIG. 8 shows four adhesion curves respectively of wheels belonging to four consecutive axles, in the case wherein the sliding value is imposed to correspond with the adhesion peak between the wheels of the axles and the route, and consequently there is no cleaning effect of the route.

In the case of an adhesion curve such as the one illustrated in FIG. 5, and in the case wherein a sliding corresponding to the adhesion peak $\mu_p$ may be imposed on all the axles, assuming (see FIG. 8) control of all axles on the adhesion peak $\mu_p$, that is, at small slides around $\delta_p$, no route cleaning is produced.

$$\Delta\mu_{12} = \Delta\mu_{23} = \Delta\mu_{34} = 0$$

and therefore $$\mu_{2,max} = \mu_{3,max} = \mu_{4,max} = \mu_{1,max}$$

All the axles thus find the same adhesion as the head axle finds (first axle in the direction of travel), as no axle cleans the route.

Thus:

$$\mu_{average} = \mu_{1,max}$$

In the case of an adhesion curve such as that of FIG. 5, wherein on all the axles a slide of $\delta \gg \delta_p$ is imposed, it may be possible to obtain a cleaning effect (this effect is certainly not a priori but rather depends on the effectiveness of the cleaning on the contaminant in question: parameter previously defined as cleaning).

Figure 9:
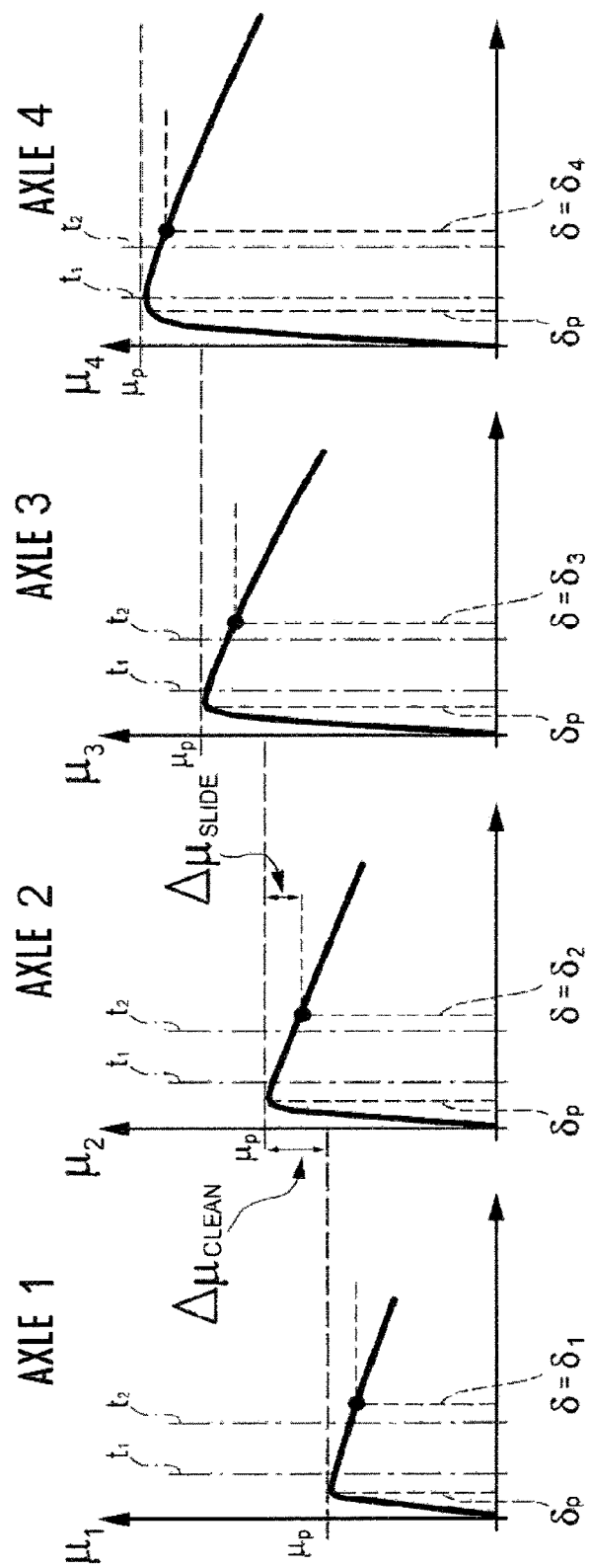
FIG. 9 shows four adhesion curves respectively of wheels belonging to four consecutive axles, in the case wherein the adhesion curve of the wheels belonging to a plurality of controlled axles of a vehicle exhibits an adhesion peak at a sliding value lower than the first predetermined threshold, and the sliding value imposed between the wheels of the axles and the routes is a higher sliding value than the second predetermined threshold.

With reference to FIG. 9:

$$\Delta\mu_{12} = \Delta\mu_{23} = \Delta\mu_{34} = \Delta\mu_{clean}$$

Therefore:

$$\mu_{2,max} = \mu_{1,max} = \Delta\mu_{clean}$$
$$\mu_{3,max} = \mu_{2,max} = \Delta\mu_{clean} = \mu_{1,max} = 2 * \Delta\mu_{clean}$$
$$\mu_{4,max} = \mu_{3,max} = \Delta\mu_{clean} = \mu_{1,max} = 3 * \Delta\mu_{clean}$$

At the same time, each axle, sliding at a $\delta$ far from the peak value $\delta_p$, may not exploit all the locally available adhesion n.

With reference to FIG. 9:

$$\mu_1 = \mu_{1,max} - \Delta\mu_{slide}$$

$$\mu_2 = \mu_{2,max} - \mu\Delta_{slide} = \mu_{1,max} + \Delta\mu_{clean} - \Delta\mu_{slide}$$

$$\mu_3 = \mu_{3,max} - \mu\Delta_{slide} = \mu_{1,max} + 2*\Delta\mu_{clean} - \Delta\mu_{slide}$$

$$\mu_4 = \mu_{4,max} - \mu\Delta_{slide} = \mu_{1,max} + 3*\Delta\mu_{clean} - \Delta\mu_{slide}$$

Calculating the average adhesion of the vehicle:

$$\mu_{average} = \mu_{1,max} + 3/2*\Delta\mu_{clean} - \Delta\mu_{slide}$$

Comparing the average adhesion obtained in the case of an adhesion curve such as illustrated in FIG. 5, in the case where all axles slide corresponding to the adhesion peak, and all axles slide at a sliding value of $\delta >> \delta_p$, if $\Delta\mu_{clean} > 2/3 * \Delta\mu_{slide}$, then the axles may be controlled at large slides of $\delta >> \delta_p$ (e.g., with a slide greater than the second predetermined threshold $t_2$). But if $\Delta\mu_{clean} > 2/3 * \Delta\mu_{slide}$, then the axles may be controlled with reduced sliding $\delta = \delta_p$ (e.g., with a slide less than the first predetermined threshold $t_1$).

In the examples given above, the adaptive factor may be equal to ⅔. In the case of five axles, the adaptive factor may be equal to ½.

In the case of adhesion curves such as those of FIG. 6, regardless of the effectiveness of cleaning, the most appropriate choice may be to bring all the axles into large slides, that is, with a slide greater than the second predetermined threshold $t_2$ ($\delta \approx 20\% \approx \delta_p$) consequently increasing both the local adhesion and the possible cleaning effect.

Figure 10:
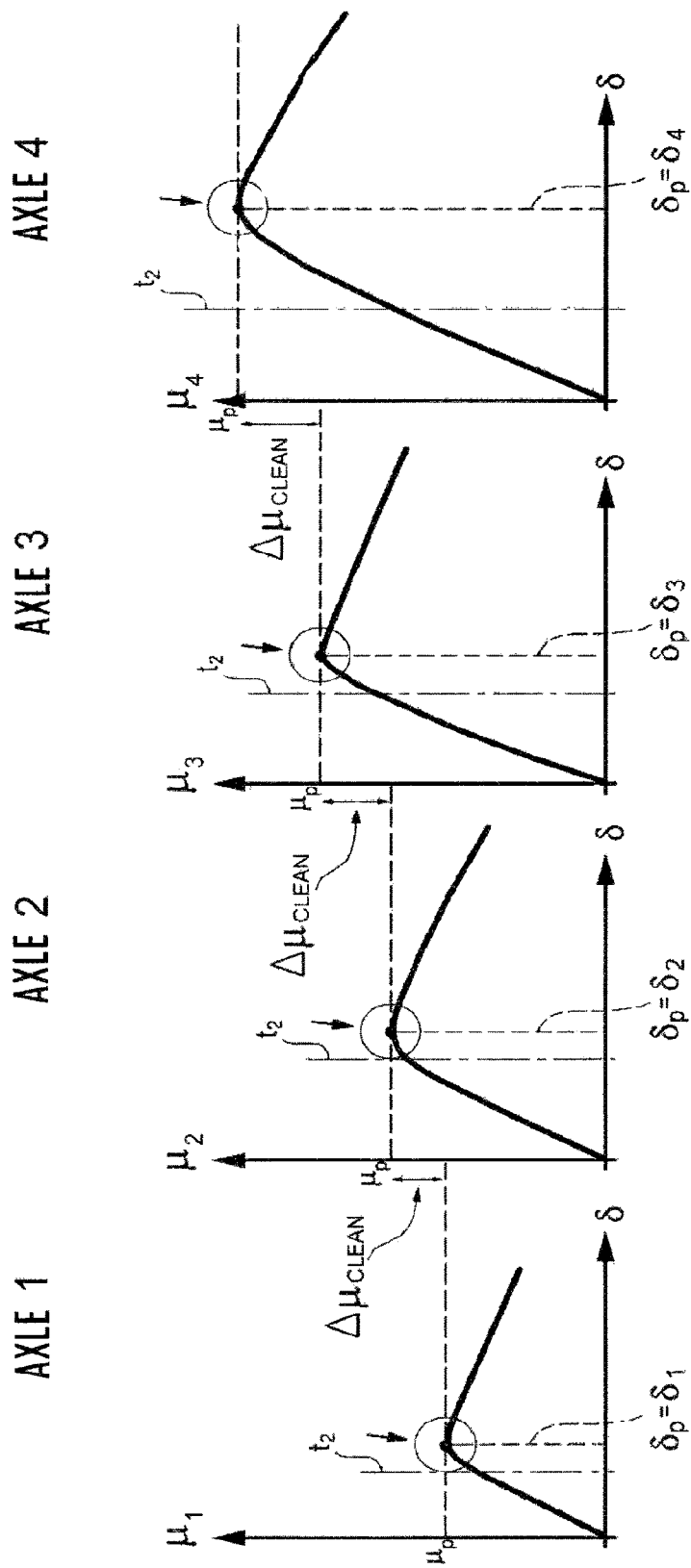
FIG. 10 shows four adhesion curves respectively of wheels belonging to four consecutive axles, in the case wherein the adhesion curves exhibit an adhesion peak at a sliding value greater than the second predetermined threshold and the sliding value imposed between the wheels of the axles and the routes is a higher sliding value than the second predetermined threshold.

According to such management of the sliding points we have (see FIG. 10):

$$\mu_1 = \mu_{1,max}$$

$$\mu_2 = \mu_{1,max} + \Delta\mu_{clean}$$

$$\mu_3 = \mu_{1,max} + 2*\Delta\mu_{clean}$$

$$\mu_4 = \mu_{1,max} + 3*\Delta\mu_{clean}$$

Thus, the average vehicle-level adhesion may be:

$$\mu_{average} = \mu_{1,max} + 3/2*\Delta\mu_{clean}$$

From the analysis of the preceding cases, (case of an adhesion curve such as the one illustrated in FIG. 5 and wherein on all the axles a slide may be imposed corresponding to the adhesion peak, the case of an adhesion curve such as the one of FIG. 5 wherein on all the axles a slide of $\delta << \delta_p$ is imposed, and the case of adhesion curves such as those in FIG. 6), it may be noted that the choice of the preferred sliding point (the one that increases the average adhesion of the vehicle) may pass through assessment of one or more factors or characteristics. These factors or characteristics can include the type of adhesion curve. For example, if the adhesion peak may be obtained for small sliding values (FIG. 5, e.g., for a slide less than the first predetermined threshold $t_1$) or for large sliding values (FIG. 6, e.g., for a slide greater than the second predetermined threshold $t_2$), then the sliding value may be close to the sliding value $\delta_{limit}$. The factors or characteristics can include $\Delta\mu_{slide}$, for example, the parameter defined only for the curve illustrated in FIG. 5. This parameter can represent a difference in adhesion between the peak of the curve and the adhesion engaged with a slide close to the limit slide (see FIG. 9). Another example of a factor or characteristic includes $\Delta\mu_{clean}$, which can represent an effectiveness of the cleaning effect from which the axle (n+1) benefits when the axle n may be made to slide with a slide greater than the second predetermined threshold $t_2$, close to $\delta_{limit}$.

In the case of a railway vehicle moving on rails, the assessment of these factors and the consequent choice of the sliding point may take place in real time (e.g., during braking of the vehicle) to increase the average adhesion engaged by the vehicle. This can increase deceleration of the vehicle and decrease the stopping distance of the vehicle.

To assess the effectiveness of cleaning (e.g., $\Delta\mu_{clean}$) a significant slide value may be imposed. For example, a slide value greater than the second predetermined threshold $t_2$ ($\delta \approx \delta_{limit}$) on the axle n and to verify the potential gain of adhesion on the axle (n+1).

At the same time, by sliding the axle with a slide greater than the second predetermined threshold $t_2$, close to $\delta_{limit}$, the route conditions may be modified for the following axles. It may become difficult to assess the adhesion value relative to small slides For example, with a slide less than the first predetermined threshold $t_1$ ($\delta < 5\%$). Therefore, the type of adhesion curve and $\Delta\mu_{slide}$ may not be able to be assessed.

The object of the invention may be to manage the sliding of the vehicle axles as follows:

FIRST AXLE: $\delta_1 \approx 1\text{-}2\%$
SECOND AXLE: $\delta_2 \approx 20\%$
THIRD AXLE: $\delta_3 = \delta_2 \approx 20\%$
FOURTH AXLE: optional The first axle, the head axle, may be controlled in a small slide. In this way, by measuring the adhesion engaged by the first axle, the adhesion value relative to small slides may be obtained $$\mu_1 = (1\text{-}2\%)$$

without producing cleaning, i.e. without changing the characteristics of the route for following axles.

The second axle may be controlled in a significant slide, i.e. greater than the second predetermined threshold $t_2$. In this way, by measuring the adhesion engaged by the second axle, the adhesion value relative to large slides may be obtained $$\mu_2 = \mu(20\%)$$

producing a possible cleaning for the following axle, cleaning that may depend on the characteristics of the contaminant ($\Delta\mu_{clean}$).

The third axle may be controlled at the same sliding value imposed for the second axle.

In this way, the effectiveness of the cleaning may be assessed by measuring the adhesion engaged by the third axle and calculating the cleaning factor:

$$\Delta\mu_{clean} = \mu_3 - \mu_2$$

Moreover, by comparing the measured adhesion for the first and second axles, the type of adhesion curve may be determined and possibly $\Delta\mu_{slide}$ may be calculated.

If ($\mu_2 > \mu_1$), it may be a case of an adhesion curve illustrated in FIG. 6.

The most appropriate choice may be to bring all the axles into large slides. For example, a sliding greater than the second predetermined threshold $t_2$ ($\delta \approx 20\% \approx \delta_{limit}$);

If ($\mu_2 > \mu_1$), it may be indicative of an adhesion curve of the type illustrated in FIG. 5) and one may calculate:

$$\Delta\mu_{slide} = \mu_1 - \mu_2$$

Evaluating all the factors, one may choose the preferred sliding point:

$$\text{If } (\Delta\mu_{clean} > 2/3 * \Delta\mu_{slide})$$

the most appropriate choice may be to bring all the axles into large slides, that is to say, a slide greater than the second predetermined threshold $t_2$ ($\delta \approx 20\% \approx \delta_{limit}$);

$$\text{if } (\Delta\mu_{clean} < 2/3 * \Delta\mu_{slide}):$$

the most appropriate choice may be to control the axles on the adhesion peak, i.e. with a slide less than the first predetermined threshold $t_1$ ($\delta < 5\%$).

The principle of the subject matter remaining the same, embodiments and details of construction may be varied with respect to those described by way of non-limiting example, without thereby departing from the scope of the invention as described and claimed herein. It is understood, moreover, that each embodiment may be combined with any other embodiment.

What is claimed is:

1. A method comprising:
    imposing a first sliding value for first adhesion values between one or more first wheels of a vehicle and a route;
    imposing a second sliding value for second adhesion values between one or more second wheels of the vehicle and the route, the first sliding value smaller than a first predetermined threshold, the second sliding value greater than a second predetermined threshold; and
    determining a trend of an adhesion curve of one or more of the first adhesion values or the second adhesion values, comprising:
        measuring the first adhesion values between the one or more first wheels and the route and the second adhesion values between the one or more second wheels and the route;
        if the second adhesion value is greater than the first adhesion value, determining that the adhesion curve between the one or more wheels of the vehicle and the route is an adhesion curve having an adhesion peak at a sliding value greater than the second predetermined threshold; and
        if the second adhesion value is lower than the first adhesion value, determining that the adhesion curve between the one or more wheels of the vehicle and the route is an adhesion curve having an adhesion peak at a sliding value lower than the first predetermined threshold,
    wherein:
        a) if it has been determined that the adhesion curve between the one or more second wheels of the vehicle and the route is an adhesion curve having an adhesion peak at a sliding value greater than the second predetermined threshold, the method comprises the step of:
            imposing a sliding value greater than the second predetermined threshold between the one or more second wheels and the route;
        b) if it has been determined that the adhesion curve between the one or more first wheels of the vehicle and the route is the adhesion curve having the adhesion peak at the sliding value lower than the first predetermined threshold, the method further comprises the steps of:
            calculating a value of an adhesion difference by means of the difference between the first adhesion value and the second adhesion value;
            imposing the second sliding value greater than the second predetermined threshold between a portion of one or more third wheels and the route, the one or more third wheels following the one or more second wheels in a direction of travel;
            calculating a value of the adhesion difference generated by a cleaning effect of the one or more second wheels of the axle to the benefit of the one or more third wheels; the value of the adhesion difference generated by the cleaning effect being obtained by the difference between a third adhesion value between the one or more third wheels of the vehicle and the route, and the second adhesion value between the one or more second wheels of the second axle and the route;
            imposing the sliding value greater than the second predetermined threshold between the one or more first wheels of the vehicle and the route, if the value of the adhesion difference generated by the cleaning effect of the one or more first wheels is predominant with respect to the value of the adhesion difference multiplied by an adaptive factor the value of which is inversely proportional to the number of wheels; and
            imposing the sliding value lower than the first predetermined threshold between the one or more first wheels of the vehicle and the route, if the value of the adhesion difference generated by the cleaning effect of the one or more first wheels is not predominant with respect to the value of the adhesion difference multiplied by an adaptive factor the value of which is inversely proportional to the number of the wheels.

2. The method of claim 1, further comprising assessing a contamination level of the route based on the trend of the adhesion curve.

3. The method of claim 1, further comprising re-assessing the contamination level after the vehicle travels a predetermined distance.

4. The method of claim 1, further comprising controlling movement of the one or more first wheels and/or the one or more second wheels based on the trend of the adhesion curve that is determined.

5. The method of claim 1, further comprising cleaning a portion of the route based on the trend of the adhesion curve that is determined.

6. The method of claim 5, wherein cleaning the portion of the route comprises controlling movement of the one or more first wheels and/or the one or more second wheels for the one or more first wheels and/or the one or more second wheels to intentionally slip against the route.

7. The method of claim 1, wherein if it has been determined that the adhesion curve of the one or more first wheels of the vehicle is an adhesion curve having an adhesion peak at a sliding value lower than the first predetermined threshold, the method further comprises the step of:
after having imposed the second sliding value greater than the second predetermined threshold between the one or more second wheels and the route, due to nonpredominance of the value of the adhesion difference generated by the cleaning effect of the one or more second wheels with respect to the value of the adhesion difference multiplied by an adaptive factor the value of which is inversely proportional to the number of wheels, if the adhesion value of the one or more second wheels is coincident with the adhesion value of an adjacent wheel, imposing the first sliding value lower than the first predetermined threshold between the one or more first wheels and the route.

8. The method of claim 1, wherein the method for assessment of contamination of the route is repeated after a predetermined time interval.

9. The method of claim 1, wherein the first predetermined threshold is less than 5% and the second predetermined threshold is between 15% and 25%.

10. A method comprising:
imposing a first sliding value lower than a first predetermined threshold between one or more first wheels of a vehicle and a route, the first sliding value being associated with one or more first wheels at a head of the vehicle according to a direction of travel of the vehicle;
imposing a second sliding value greater than a second predetermined threshold between the one or more second wheels of the vehicle and the route; the second sliding value being associated with one or more second wheels following the one or more first wheels of the head of the vehicle according to the travel direction of the vehicle, and the second predetermined threshold being greater than the first predetermined threshold;
imposing a third sliding value equal to the second sliding value between the one or more third wheels of the vehicle and the route; the third sliding value being associated with one or more third wheels following the one or more second wheels having the second sliding value according to the travel direction of the vehicle;
determining effectiveness of the cleaning of the route generated by the second sliding value to the benefit of the one or more third wheels with the third sliding value and the route and a second adhesion value between the one or more third wheels having the third sliding value and the route.

11. The system of claim 10, further comprising assessing a contamination level of the route based on a trend between the first adhesion value and the second adhesion value.

12. The method of claim 11, further comprising re-assessing the contamination level after the vehicle travels a predetermined distance.

13. The method of claim 10, wherein the step of determining the effectiveness of the cleaning of the route comprises the steps of:
measuring the first adhesion value and the second adhesion value; and
determining the effectiveness of the cleaning by performing a subtraction operation between the second adhesion value and the first adhesion value.

14. The method of claim 10, wherein the first predetermined threshold is less than 5% and the second predetermined threshold is between 15% and 25%.

15. The method of claim 10, wherein the first predetermined threshold is less than 3% and the second predetermined threshold is between 20% and 25%.

16. A system comprising:
a controller configured to:
impose a first sliding value lower than a first predetermined threshold, the first sliding value for adhesion between one or more first wheels of a vehicle and a route;
impose a second sliding value greater than a second predetermined threshold, the second sliding value for adhesion between the one or more second wheels of the vehicle and the route; and
determine a trend of an adhesion curve between the one or more first wheels, the one or more second wheels and the route, based on a first adhesion value and a second adhesion value, wherein the controller, configured to determine the trend of the adhesion curve, is further configured to:
measure the first adhesion values between the one or more first wheels and the route and the second adhesion values between the one or more second wheels and the route;
if the second adhesion value is greater than the first adhesion value, determine that the adhesion curve between the one or more wheels of the vehicle and the route is an adhesion curve having an adhesion peak at a sliding value greater than the second predetermined threshold; and
if the second adhesion value is lower than the first adhesion value, determine that the adhesion curve between the one or more wheels of the vehicle and the route is an adhesion curve having an adhesion peak at a sliding value lower than the first predetermined threshold,
wherein:
a) if the controller has determined that the adhesion curve between the one or more second wheels of the vehicle and the route is an adhesion curve having an adhesion peak at a sliding value greater than the second predetermined threshold, the controller is further configured to:
impose a sliding value greater than the second predetermined threshold between the one or more second wheels and the route;
b) if the controller has determined that the adhesion curve between the one or more first wheels of the vehicle and the route is the adhesion curve having the adhesion peak at the sliding value lower than the first predetermined threshold, the controller is further configured to:
calculate a value of an adhesion difference by means of the difference between the first adhesion value and the second adhesion value;
impose the second sliding value greater than the second predetermined threshold between a portion of one or more third wheels and the route, the one or more third wheels following the one or more second wheels in a direction of travel;

calculate a value of the adhesion difference generated by a cleaning effect of the one or more second wheels of the axle to the benefit of the one or more third wheels; the value of the adhesion difference generated by the cleaning effect being obtained by the difference between a third adhesion value between the one or more third wheels of the vehicle and the route, and the second adhesion value between the one or more second wheels of the second axle and the route;

impose the sliding value greater than the second predetermined threshold between the one or more first wheels of the vehicle and the route, if the value of the adhesion difference generated by the cleaning effect of the one or more first wheels is predominant with respect to the value of the adhesion difference multiplied by an adaptive factor the value of which is inversely proportional to the number of wheels; and impose the sliding value lower than the first predetermined threshold between the one or more first wheels of the vehicle and the route, if the value of the adhesion difference generated by the cleaning effect of the one or more first wheels is not predominant with respect to the value of the adhesion difference multiplied by an adaptive factor the value of which is inversely proportional to the number of the wheels.

17. The system of claim 16, further comprising assessing a contamination level of the route based on the trend of the adhesion curve.

18. The system of claim 16, further comprising re-assessing the contamination level after the vehicle travels a predetermined distance.

* * * * *